June 30, 1931.     D. G. HOTTMANN     1,812,240
TRAILER COUPLING
Filed July 8, 1930
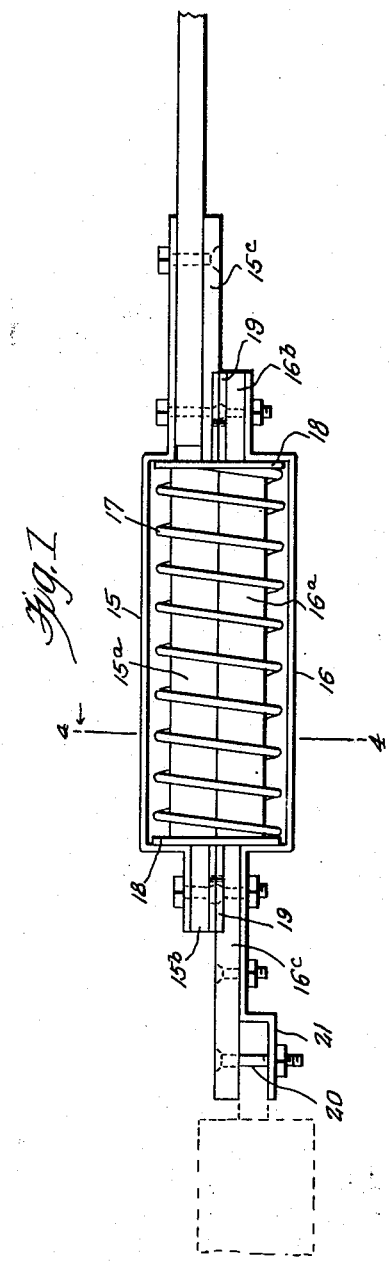
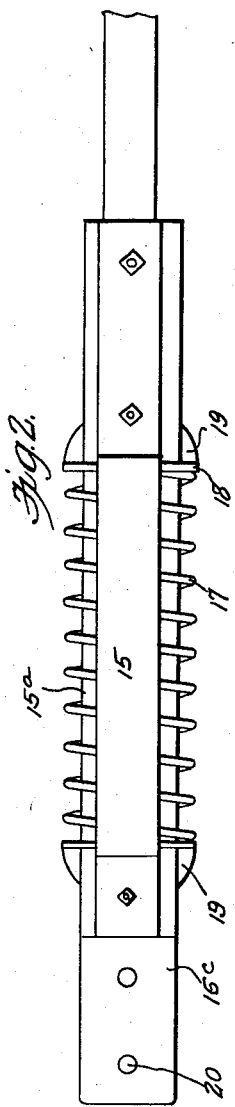
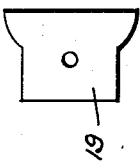
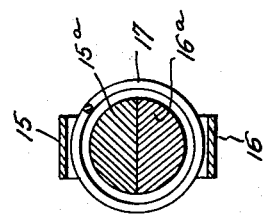
Inventor
David G. Hottmann,
By *Clarence A. O'Brien*
Attorney Patented June 30, 1931

1,812,240

UNITED STATES PATENT OFFICE

DAVID G. HOTTMANN, OF TOLSTOY, SOUTH DAKOTA

TRAILER COUPLING

Application filed July 8, 1930. Serial No. 466,549.

This invention relates generally to couplings for wagons and trailers for hitching said wagons or trailers to an automobile, to be drawn thereby, and particularly to coupling means of the spring, or shock absorbing, non-jar type.

It is the object of this invention to provide a coupling means of this type which by its spring resilience, will draw the trailer or wagon after the automobile without jars and shock and the unevenness from the road being transmitted from the automobile to the trailer or vice versa, or the stresses of drawing a heavy load on the trailer or wagon and subjecting the gears of the automobile to unusual and dangerous and destructive strain.

These and other objects are attained by a combination of, and arrangement of, parts, the nature and combination which will be better understood from a reading of the accompanying description, and the drawings, in which:

Figure 1 is a side view of a preferred form of my invention.

Figure 2 is a top view thereof.

Figure 3 is a cross section taken in the plane indicated by the line 4—4 of Figure 1.

Figure 4 is a plan view of one of the wear plates hereinafter explicitly referred to.

It is to be understood that I do not wish to limit the application of this invention to the particular embodiment set out herein, but any changes may be made in the material and construction within the spirit and scope of the invention.

Referring in detail to the drawings, the embodiment shown consists of a bar 15a of semi-circular form in cross section having a round side and a flat side, and a reduced portion 15b and another reduced portion on the opposite end 15c. Another semi-circular bar 16a having a reduced portion 16b and another reduced portion 16c at the opposite end thereof. These bars 15a and 16a may be formed from a single bar cut in half longitudinally.

The bars are disposed with their flat faces in contact and exteriorly of the cylindrical core thus produced is a spring 17 of compressible type and of sufficient tension for the conditions under which it is to operate. The reduced portions 15b, 15c and 16b and 16c are formed squared at their edges to receive and have bolted thereto bars 15 and 16 as shown in the drawings.

Buffer plates 19 co-act with washers 18 to evenly compress the spring 17 when a load is put upon both ends of the coupling. The bar 15 is formed at one end to provide a space between said bar and a member 15c to accommodate and bolt therein the shaft of the trailer. A member 16c has fixedly connected thereto an extension of the bar 16 which is formed and bent outward from the part 16c and to provide the feature for attaching to the automobile. Said members 15c and 16c are shouldered, Figure 1, to abut against outer edges of plates 19 next to the members. It will also be understood that the opposed members 19 serve as wear plates.

The bolt 20 for attaching to the automobile, spans the space between the bar 16c and the extension of the bar 16 at 21. All of the bolts connecting the elements of this coupling have heads countersunk so as not to interfere with the sliding movements of the bars 15a and 16a. As will be observed in the drawings, the bars 15 and 16 and their extensions are positioned to retain the spring 17 by means of the washers 18 and the plates 19 which are of the formation illustrated in Figure 4, one of these plates being bolted to 15c and another in coinciding relation at 16c and one end of the device in contact with the washer 18, and another plate is bolted to 15c and another to 16c in coinciding relation, bearing against the washer 18 at the other end.

The operation of the device will be understood from the foregoing explanation of the drawings and it will be clear that I have provided an inexpensive device of the character described, which has a very satisfactory operation and providing as it does a double acting coupling of the spring type, said double acting coupling being obtained and by the use of only one spring.

It will be observed that the action of this coupling is such as to permit starting and stopping while drawing heavy loads without transferring the destructive and damaging shock to either vehicle such as must take place without the use of a similar device.

It will be observed that the even distribution of the pressure to the spring produces a smooth acting device admirably suited for the purpose for which it was designed, and satisfactory to use, maintain and repair, easy and simple of installation and comparatively cheap to manufacture.

I claim:

A coupling device comprising bars of semi-circular form in cross section arranged with their flat sides in opposed relation and having flat end portions, the flat end portion of one bar being adjacent one end of the device, and the flat end portion of the other bar being adjacent the opposite end of the device, a spring coiled about the semi-circular portion of the bars, washers surrounding the bars and opposed to the ends of the spring, wear plates arranged in endwise relation to the washers and disposed at the inner sides of the end portions of the said bars, the plates immediately adjacent the end portions of the bar being connected to said end portions, shouldered members abutting against and connected to the plates remote from the end portions of the bars, a longitudinal strap arranged opposite the convolutions of the spring and having one end portion connected to the end portion of one bar and also having another end portion connected with one of said members and adapted to cooperate therewith in connecting the device to the shaft of a trailer, and another strap arranged opposite the convolutions of the spring and having an end portion connected with the end portion of the other bar and also having another end portion connected with the other member and adapted to cooperate therewith in connecting the device to a motor vehicle; the said longitudinal strap also having shoulders opposed to the outer sides of said washer.

In testimony whereof I affix my signature.

DAVID G. HOTTMANN.